United States Patent
Takahashi et al.

(10) Patent No.: US 9,948,841 B2
(45) Date of Patent: Apr. 17, 2018

(54) TIRE SHAPE TESTING DEVICE AND TIRE SHAPE TESTING METHOD

(75) Inventors: Eiji Takahashi, Hyogo (JP); Toshiyuki Tsuji, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 754 days.

(21) Appl. No.: 14/005,251

(22) PCT Filed: Mar. 7, 2012

(86) PCT No.: PCT/JP2012/055738
§ 371 (c)(1),
(2), (4) Date: Sep. 13, 2013

(87) PCT Pub. No.: WO2012/124553
PCT Pub. Date: Sep. 20, 2012

(65) Prior Publication Data
US 2014/0002641 A1   Jan. 2, 2014

(30) Foreign Application Priority Data
Mar. 15, 2011 (JP) .................................. 2011-056782

(51) Int. Cl.
*H04N 7/18* (2006.01)
*H04N 9/47* (2006.01)
(Continued)

(52) U.S. Cl.
CPC ........... *H04N 5/2256* (2013.01); *G01B 11/25* (2013.01); *G01M 17/027* (2013.01)

(58) Field of Classification Search
CPC ........... G01B 11/2522; G01B 11/2518; G01M 17/027
(Continued)

(56) References Cited

U.S. PATENT DOCUMENTS 5,978,077 A * 11/1999 Koerner ............... G01B 11/275
33/203.16
6,615,650 B2 * 9/2003 Mahner ............... G01M 17/027
73/146
(Continued)

FOREIGN PATENT DOCUMENTS

EP      2020594 A1    2/2009
JP    53-002580 U    1/1978
(Continued)

OTHER PUBLICATIONS

The extended European search report issued by the European Patent Office dated Jul. 31, 2014, which corresponds to European Patent Application No. 12757134.7-1558 and is related to U.S. Appl. No. 14/005,251.
(Continued)

*Primary Examiner* — Jeremaiah C Hallenbeck-Huber
(74) *Attorney, Agent, or Firm* — Studebaker & Brackett PC (57) ABSTRACT

In order to enable the shape of the surface of a tire including the shoulder sections thereof to be detected, a tire shape testing device comprises: a first linear light application means (10) for applying linear light to the tread section (8) of the tire; a second linear light application means (12) for applying linear light to the sidewall sections (7) of the tire; a third linear light application means (13) for applying linear light to the shoulder sections (9) and to regions outside the shoulder sections (9); and image capturing means (16) for capturing the images of the linear light applied by the first linear light application means (10), the second light application means, and the third linear light applications means (13) and reflected by the surface of the tire.

12 Claims, 4 Drawing Sheets

(51) Int. Cl.
*H04N 5/225* (2006.01)
*G01B 11/25* (2006.01)
*G01M 17/02* (2006.01)

(58) Field of Classification Search
USPC .......................................... 348/92, 125, 136
See application file for complete search history.

(56) References Cited

U.S. PATENT DOCUMENTS

| | | | | |
|---|---|---|---|---|
| 7,805,987 | B1* | 10/2010 | Smith ................. | G01M 17/027 73/146.5 |
| 8,625,105 | B2* | 1/2014 | Pryce .................... | G01B 11/22 356/139.09 |
| 9,114,676 | B2* | 8/2015 | Sotgiu ................... | B60C 25/132 |
| 2003/0160193 | A1* | 8/2003 | Sanchez Revuelta . | G01B 11/25 250/559.19 |
| 2007/0295071 | A1* | 12/2007 | (Wase; Masanori ... | G01B 11/25 73/146 |
| 2008/0218742 | A1* | 9/2008 | Sakoda ............... | G01M 17/027 356/73 |
| 2009/0033949 | A1 | 2/2009 | Braghiroli | |
| 2009/0040533 | A1* | 2/2009 | Takahashi .......... | G01B 11/2522 356/612 |
| 2009/0295906 | A1* | 12/2009 | Kushimoto .......... | B60Q 1/0023 348/36 |
| 2011/0188731 | A1* | 8/2011 | Sekiguchi ............. | G01B 11/30 382/141 |
| 2012/0008148 | A1* | 1/2012 | Pryce .................... | G01B 11/22 356/601 |

FOREIGN PATENT DOCUMENTS

| | | |
|---|---|---|
| JP | 11-281332 A | 10/1999 |
| JP | 2003-148936 A | 5/2003 |
| JP | 2003-254731 A | 9/2003 |
| JP | 2006-064975 A | 3/2006 |
| JP | 2008-185511 A | 8/2008 |
| JP | 2008-221896 A | 9/2008 |
| JP | 2009-042114 A | 2/2009 |
| JP | 2009-250740 A | 10/2009 |
| JP | 2010-145374 A | 7/2010 |
| WO | WO 201010041 A2 * | 9/2010 ............. G01B 11/22 |

OTHER PUBLICATIONS

International Search Report; PCT/JP2012/055738; dated Jun. 12, 2012.
Written Opinion of the International Searching Authority; PCT/JP2012/055738; dated Jun. 12, 2012.

* cited by examiner

TIRE SHAPE TESTING DEVICE AND TIRE SHAPE TESTING METHOD

TECHNICAL FIELD

The present invention relates to a tire shape testing device and a tire shape testing method for capturing an image of linear light with which a surface of a tire including a sidewall section, a shoulder section, and a tread section has been irradiated, and detecting a surface shape of the tire on the basis of the captured image of the linear light.

BACKGROUND ART

A shape test for testing the external shape of a tire has generally been performed in a testing process performed after a tire curing step, which is the final step of a tire manufacturing process. The shape test is essential since tires are rubber products, and it is difficult to form tires in accurate shapes. In general, a visual and tactile test has been manually performed in the shape test. However, attempts have been made to automate the shape test by using a laser, a camera, etc, in recent years.

To automate the shape test of a tire, first, a sidewall section of the tire is irradiated with a linear light beam. An image of the linear light beam is captured with a camera, and a three-dimensional shape of the sidewall section is measured by the light-section method. When measuring the three-dimensional shape of the sidewall section, characters, logos, etc., included in the captured image of the sidewall section are detected through image processing, and the influence of normal projections and recesses that form the characters, logos, etc., is eliminated. Thus, the shape of the sidewall section including local irregularity defects and the like is determined.

In addition, with increase in width of a tread section, for example, technologies of shape test for the tread section have recently been developed, and a shape test for a region including a shoulder section, which is provided between the tread section and the sidewall section, has also been performed.

PTL 1 and PTL 2 disclose technologies for performing a shape test for the shoulder section.

According to PTL 1, a slit image of a tire crown section (shoulder section) is captured while imaging means and a tire are moved relative to each other, the imaging means including light emitting means that irradiates the tire crown section with slit light and image capturing means that captures an image of a section illuminated with the slit light. An RRO, which is a displacement of the circumferential shape of the tire from a central axis, is calculated by using shape data of the tire crown section. The shape data is calculated by using brightness data of the slit image, the brightness data reflecting projections and recesses in the tire crown section whose image has been captured.

PTL 2 discloses a tire shape detecting apparatus that captures an image of linear light with which a surface of a relatively rotating tire has been irradiated and that performs shape detection by the light-section method on the basis of the captured image to thereby detect a surface shape of the tire. The tire shape detecting apparatus includes linear light application means for emitting a plurality of linear light beams in a continuously joined manner so that a single light section line is formed on the surface of the tire, the linear light beams being emitted in directions different, from a detection height direction of the light section line; and image capturing means for capturing images of the plurality of linear light beams, with which the surface of the tire has been irradiated, in a direction in which the principal ray of each of the plurality of linear light beams is regularly reflected by the surface of the tire.

CITATION LIST

Patent Literature

PTL 1: Japanese Unexamined Patent Application Publication No. 2008-185511

PTL 2: Japanese Unexamined Patent Application Publication No. 2008-221896

SUMMARY OF INVENTION

Technical Problem

According to PTL 1, although the shape of the shoulder section can be tested by increasing the number of sensor heads (cameras), the cost increases and maintenance becomes complex. Therefore, it is difficult to put the technology of PTL 1 into practical use. According to PTL 2, the number of cameras can be reduced by providing a plurality of linear light beams, and the problem of PTL 1 can be reduced.

However, in PTL 2, the shoulder section, for example, is irradiated with a linear light beam dedicated to the shoulder section, and the tread section is irradiated with a linear light beam dedicated to the tread section. Therefore, the number of devices used to emit the linear light beams necessarily increases when the shape of a wide tire is to be tested. As a result, there has been a problem that it is difficult to perform a shape test for a wide tire.

In light of the above-described problems, an object of the present invention is to provide a tire shape testing device and a tire shape testing method with which a surface shape of a tire can be detected over a region including a shoulder section.

Solution to Problem

To achieve the above-described object, the present invention provides the following technical means.

According to one technical means of the present invention, a tire shape testing device that captures an image of linear light with which a surface of a tire including a sidewall section, a shoulder section, and a tread section has been irradiated and that detects a surface shape of the tire on the basis of the captured image of the linear light includes first linear light application means that irradiates the tread section of the tire with a linear light beam; second linear light application means that irradiates the sidewall section of the tire with a linear light beam; third linear light application means that irradiates a region from the shoulder section of the tire to beyond the shoulder section with a linear light beam; and image capturing means that captures images of the linear light beams emitted from the first linear light application means, the second linear light application means, and the third linear light application means and reflected by the tire surface.

Preferably, the linear light beams emitted from at least two of the first linear light application means, the second linear light application means, and the third linear light application means overlap on the same line.

Preferably, the image capturing means includes first image capturing means and second image capturing means, a first sensor unit including the first image capturing means and the first linear light application means is arranged so as to face the tread section of the tire, a second sensor unit including the second image capturing means, the second linear light application means, and the third linear light application means is arranged so as to face the sidewall section of the tire, and the second image capturing means included in the second sensor unit is configured to capture the image of the linear light beam emitted from the second linear light application means and reflected by the tire surface and the image of the linear light beam emitted from the third linear light application means and reflected by the tire surface.

Preferably the image capturing means includes first image capturing means and second image capturing means, a first sensor unit including the first image capturing means, the first linear light application means, and the third linear light application means is arranged so as to face the tread section of the tire, a second sensor unit including the second image capturing means and the second linear light application means is arranged so as to face the sidewall section of the tire, and the first image capturing means included in the first sensor unit is configured to capture the image of the linear light beam emitted from the first linear light application means and reflected by the tire surface and the image of the linear light beam emitted from the third linear light application means and reflected by the tire surface.

Preferably, the image capturing means includes first image capturing means and second image capturing means, a first sensor unit including the first image capturing means and the first linear light application means is arranged so as to face the tread section of the tire, a second sensor unit including the second image capturing means and the second linear light application means is arranged so as to face the sidewall section of the tire, the third linear light application means is located separately from the first sensor unit and the second sensor unit, and at least one of the first image capturing means included in the first sensor unit and the second image capturing means included in the second sensor unit is configured to capture the image of the linear light beam emitted from the third linear light application means and reflected by the surface of the tire.

Preferably, the third linear light application means is supported by a support mechanism capable of changing an installation position of the third linear light application means.

Preferably, the image capturing means includes a detector that detects the linear light beams, a plurality of lenses that focus the images of the linear light beams on the detector, and a region setting mirror that sets image capturing regions to be captured through the respective lenses.

Preferably, two or more of the region setting mirrors are provided, each region setting mirror being set so that the image capturing regions captured through the respective lenses do not overlap and are discontinuous.

Preferably, the image capturing region of one of the plurality of lenses is set so as to allow the tread section of the tire to be captured, and the image capturing region of another one of the plurality of lenses is set so as to allow the shoulder section of the tire to be captured.

Preferably, the image capturing region of one of the plurality of lenses is set so as to allow the sidewall section of the tire to be captured, and the image capturing region of another one of the plurality of lenses is set so as to allow the shoulder section of the tire to be captured.

Preferably, each lens is formed of a lens array.

Preferably, a correcting lens that corrects an optical magnification of each lens is further included.

According to another technical means of the present invention, a tire shape testing method for capturing an image of linear light with which a surface of a tire including a sidewall section, a shoulder section, and a tread section has been irradiated and detecting a surface shape of the tire on the basis of the captured image of the linear light includes irradiating each of the tread section of the tire and the sidewall section of the tire with a linear light beam, irradiating a region from the shoulder section of the tire to beyond the shoulder section with a linear light beam, and capturing images of the linear light beams reflected by the tire surface.

Advantageous Effects of Invention

According to the present invention, a tire surface can be easily tested over a wide region including a shoulder section. Therefore, the surface shape of a large, wide tire can be reliably tested.

BRIEF DESCRIPTION OF DRAWINGS

In FIG. 2, part (a) is an enlarged illustration of a part around sensor units according to the first embodiment, and part (b) is an enlarged illustration of a modification of part (a).

DESCRIPTION OF EMBODIMENTS

Embodiments of the present invention will be described with reference to the drawings.

First Embodiment

In recent years, there has been a demand for a shape test for testing not only sidewall sections and a tread section but also shoulder sections of a tire, in other words, for testing the entire surface of a wide tire. To comply with such a demand, a tire shape testing device of the present invention is capable of detecting the surface shapes of sidewall sections, a tread section, and shoulder sections of a tire.

A tire shape testing device according to the present embodiment will now be described in detail.

Figure 1:
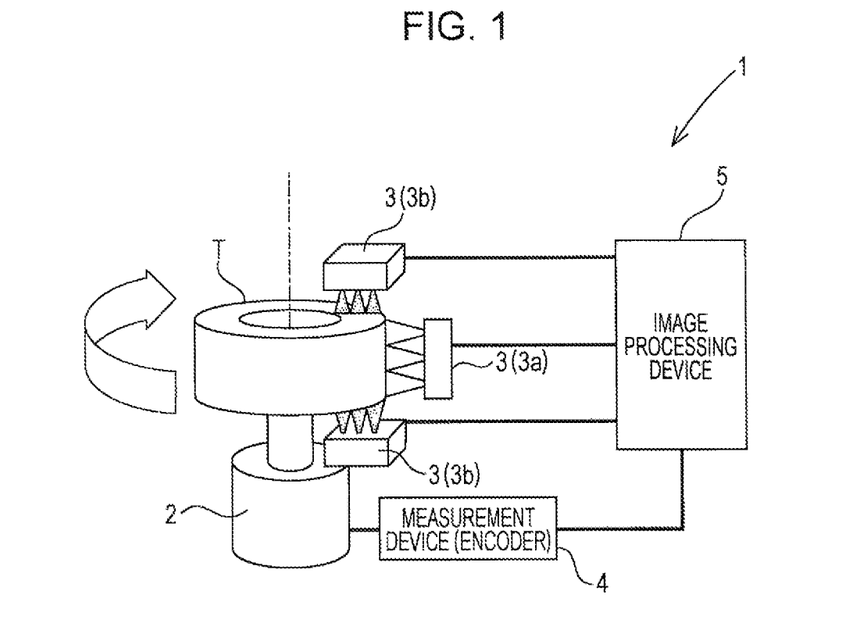
FIG. 1 is a schematic diagram of a tire shape testing device according to a first embodiment.

As illustrated in FIG. 1, a tire shape testing device 1 includes a tire rotator 2, sensor units 3, a measuring device 4, and an image processing device 5.

The tire rotator 2 is a rotating device including a motor or the like that rotates a tire T, which is a subject of the shape test, around a rotation axis of the tire T. The tire rotator 2 rotates the tire T at a rotational speed of, for example, 60 rpm. Images of the surface shape of the tire T are captured by the sensor units 3 while the tire T is being rotated.

The sensor units 3 are provided to capture the images of the surface shape of the tire T, and are arranged around the tire T. As illustrated in FIG. 1, in the present embodiment, in the state in which the tire is attached to the tire rotator 2, a single sensor unit (first sensor unit 3a) is arranged so as to face a tread section (right side of the tire T), and a single sensor unit (second sensor unit 3b) is arranged so as to face each sidewall section (each of top and bottom surfaces of the tire T).

The measuring device 4 detects the rotational speed of the tire T (tire rotator 2), and includes an encoder. The encoder 4 detects a rotational angle of a rotation shaft of the tire rotator 2, and outputs the detection result as a detection signal. The detection signal is used to control the timing at which the first sensor unit 3a and the second sensor units 3b capture the images of the surface shape of the tire T.

For example, the image processing device 5 receives the detection signal output from the encoder 4 each time the tire T, which rotates at a speed of 60 rpm, rotates by a predetermined angle, and controls the image capturing operation of the first sensor unit 3a and the second sensor units 3b in accordance with the timing at which the detection signal is received.

The image processing device 5 is receives line images of the tire surface and obtains height distribution information of a portion that has been irradiated with linear light by applying the light-section method to each line image. The image processing device 5 includes, for example, a personal computer, and is not particularly limited as long as the shapes of projections and recesses in the surface of the tire T (variations on the tire surface) can be acquired by the light-section method.

The first sensor unit 3a and the second sensor units 3b will now be described in more detail.

Figure 2:
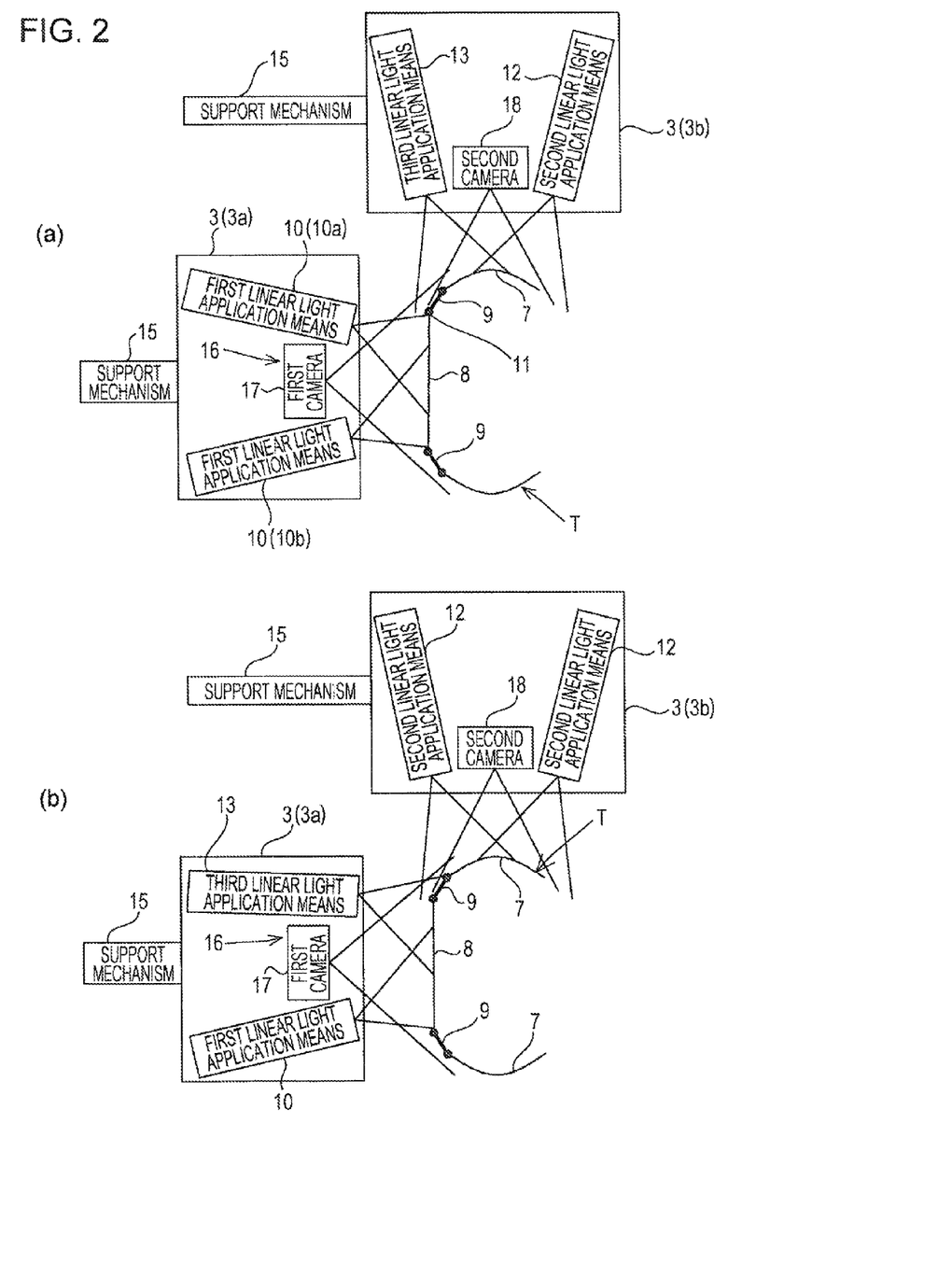

As illustrated in FIG. 2(a), the first sensor unit 3a, which is arranged so as to face a tread section 8 of the tire T, includes linear light application means (hereinafter referred to as first linear light application means) 10 that emit linear light beams (light section lines) toward the tread section 8.

Each first linear light application means 10 includes an LED, a halogen lamp, or the like, and two first linear light application means 10a and 10b are provided in the first sensor unit 3a. Optical axes (output axes) of the first linear light application means 10a and 10b are directed toward the tread section 8 in the state in which the tire T is installed. Specifically, one first linear light application means 10a irradiates, with a linear light beam, a region from a boundary section 11 between the tread section 8 and a shoulder section 9 of the tire T to a central area of the tread section 8 along a width direction of the tire T.

The other first linear light application means 10b irradiates, with a linear light beam, a region from a boundary section 11 at the side opposite the one first linear light application means 10a to a central area of the tire T along the width direction of the tread section 8.

Namely, the linear light beam emitted from the one first linear light application means 10a and the linear light beam emitted from the other first linear light application means 10b overlap on the tread section 8 of the tire T to form a single light section line, and only the tread section 8 of the tire T is irradiated with the linear light beams from the two first linear light application means 10a and 10b. The number of first linear light application means 10 (10a and 10b) is not limited. For example, a single first linear light application means 10 may be provided so that only the tread section 8 of the tire T is irradiated with a linear tight beam emitted therefrom.

Each second sensor unit 3b, which is arranged so as to face a corresponding sidewall section 7 of the tire T, includes linear light application means (hereinafter referred to as second linear light application means) 12 that irradiates the sidewall section 7 with a linear light beam and linear light application means (third linear light application means) 13 that irradiates a corresponding shoulder section 9 with a linear light beam.

The second linear light application means 12 includes an LED, a halogen lamp, or the like, and a single second linear light application means 12 is provided in the second sensor unit 3b. An optical axis (output axis) of the second linear light application means 12 is directed toward the sidewall section 7 in the state in which the tire T is installed. The second linear light application means 12 irradiates a part of the sidewall section 7 with a linear light beam. The second linear light application means 12 may instead be configured to irradiate the entire region of the sidewall section 7 with the linear light beam. In other words, among the tread section 8, the sidewall section 7, and the shoulder section 9, the second linear light application means 12 irradiates only the sidewall section 7 with the linear light beam.

The third linear light application means 13 is formed separately from the second linear light application means 12 and includes an LED, a halogen lamp, or the like. A single third linear light application means 13 is provided in the second sensor unit 3b. An optical axis (output axis) of the third linear light application means 13 is directed toward the shoulder section 9 in the state in which the tire T is installed. The third linear light application means 13 irradiates the entire region of the shoulder section 9 and a part of the sidewall section 7 with a linear light beam. Namely, the third linear light application means 13 irradiates a region from the shoulder section 9 to beyond the boundary section between the shoulder section 9 and the sidewall section 7 with the linear light beam.

In this embodiment, the linear light beam emitted from the second linear light application means 12 and the linear light beam emitted from the third linear light application means 13 overlap on the sidewall section 7 of the tire to form a single light section line, and the entire region of the ride wall section is irradiated with these linear light beams. The third linear light application means 13 irradiates only the shoulder section 9 with the linear light beam.

The position of each linear light application means relative to the tire is set so that the linear light beams emitted from the first linear light application means 10, the linear light beam emitted from the second linear light application means 12, and the linear light beam emitted from the third linear light application means 13 are on the same line. In other words, the positions of the first linear light application means 10, the second linear light application means 12, and the third linear light application means 13 are set so that a profile of the tire in a single cross section (single cross section taken along a width direction of the tire) appears when the linear light beams are simultaneously emitted from the first linear light application means 10, the second linear light application means 12, and the third linear light application means 13, and images of the linear light beams reflected by the tire surface are captured.

In plan view, the installation positions (installation angles) of the first linear light application means 10, the second linear light application means 12, and the third linear light application means 13 relative to the tire may be set as appropriate in accordance with the parts to be illuminated. It is very preferable that each of the first sensor unit 3a and the second sensor unit 3b be provided with a support mechanism 15, and that the first sensor unit 3a and the second sensor unit 3b be moved toward and away from the tire by the respective support mechanisms 15 to adjust the regions of the tire surface irradiated with the linear light beams.

The first sensor unit 3a and the second sensor unit 3b are provided with image capturing means 16 that captures images of the linear light beams emitted from the first linear light application means 10, the second application means, and the third linear light application means 13, and reflected by the tire surface.

Specifically the image capturing means 16 includes a first camera 17 (first image capturing means) that is included in the first sensor unit 3a and captures at least the images of the linear light beams (reflected light beams) reflected by the tread section 8 of the tire T, and a second camera 18 (second image capturing means) that is included in the second sensor unit 3b and captures at least the images of the linear light beams reflected by the sidewall section 7 of the tire T.

More specifically, the first camera 17 includes a camera in which a semiconductor image sensor, such as a CCD sensor, is mounted, and captures the images of the linear light beams (reflected light beams) from the entire region of the tread section 8 and a part of the shoulder section 9. The first camera 17 may instead capture the image of the linear light beam (reflected light beam) from the entire region of the shoulder section 9. In other words, the first camera 17 captures the image of the linear light beam emitted from the third linear light application means 13 and reflected by the tire surface and the images of the linear light beams emitted from the first linear light application means 10 and reflected by the tire surface.

Similar to the first camera 17, the second camera 18 also includes a CCD camera, and captures the images of the linear light beams (reflected light beams) from the entire region of the sidewall section 7 and a part of the shoulder section 9. The second camera 18 may instead capture the image of the linear light beam (reflected light beam) with which the entire region of the shoulder section 9 has been irradiated. In other words, the second camera 18 captures the image of the linear light beam emitted from the third linear light application means 13 and reflected by the tire surface and the image of the linear light beam emitted from the second linear light application means 12 and reflected by the tire surface. The image of the linear light beam reflected by the shoulder section 9 may either be captured by both the first camera 17 and the second camera 18, or by one of the first camera 17 and the second camera 18.

To detect the surface shape of the tire with the above-described tire shape testing device 1, first, the first linear light application means 10 irradiate the tread section 8 with linear light beams. At the same time, the second linear light application means 12 irradiates the sidewall section 7 with a linear light beam. Additionally, the third linear light application means 13 irradiates the region that covers the shoulder section 9 and extends into the sidewall section 7 with a linear light beam.

Images of the linear light beams reflected by the tire surface (the tread section 8, the shoulder section 9, and the sidewall section 7) are captured by the first camera 17 and the second camera 18.

Next, the image processing device 5 processes the captured image on the basis of the principle of triangulation, thereby detecting projections and recesses in the surface of the tire (three dimensional shape).

Thus, the surface shape of not only the tread section 8 and the sidewall section 7 but also the shoulder section 9 can be reliably detected. In particular, since the third linear light application means 13 irradiates the region that covers the shoulder section 9 and extends into the sidewall section 7 with the linear light beam, even when the sidewall section 7 of the tire is large, images of the surface shape of the sidewall section 7 and the shoulder section 9 can be captured without increasing the number of devices for emitting the linear light beams.

The third linear light application means 13 may irradiate a region extending into the tread section 8 beyond the shoulder section 9 with the linear light beam. Specifically, as illustrated in FIG. 2(b), the third linear light application means 13 may be included in the first sensor unit 3a and irradiate the entire region of the shoulder section 9 and a part of the tread section 8 with a linear light beam. The third linear light application means 13 may irradiate a part of the shoulder section 9 instead of the entire region of the shoulder section 9 with the linear light beam.

In this case, a part of the tread section 8 and the shoulder section 9 may be irradiated with the linear light beam from the third linear light application means 13. Accordingly, images of the surface shapes of the tread section 8 and the shoulder section 9 can be captured without increasing the number of devices for emitting the linear light beams even when the tire is a so-called super single tire, which is an extremely wide tire that appears as if two tires are connected together and which has become increasingly popular in recent years.

To summarize the above, in the tire shape testing device 1 illustrated in FIG. 2(a), the first sensor unit 3a including the first camera 17 and the first linear light application means 10 is arranged so as to face the tread section 8, and the second sensor unit 3b including the second camera 18, the second linear light application means 12, and the third linear light application means 13 is arranged so as to face the sidewall section 9.

In addition, in the tire shape testing device 1, the second camera 18 included in the second sensor unit 3b is configured to capture an image of the linear light beam emitted from the second linear light application means 12 and reflected by the tire surface, and an image of the linear light beam emitted from the third linear light application means 13 and reflected by the tire surface.

With this structure, the tire shape testing device 1 illustrated in FIG. 2(a) is capable of reliably testing the shoulder section 9 and the sidewall section 7.

In the tire shape testing device 1 illustrated in FIG. 2(b), the first sensor unit 3a including the first camera 17, the first linear light application means 10, and the third linear light application means 13 is arranged so as to face the tread section 8, and the second sensor unit 3b including the second camera 18 and the second linear light application means 12 is arranged so as to face the sidewall section 7.

In addition, in the tire shape testing device 1, the first camera 17 included in the first sensor unit 3a is configured to capture an image of the linear light beam emitted from the first linear light application means 10 and reflected by the tire surface, and an image of the linear light beam emitted from the third linear light application means 13 and reflected by the tire surface.

With this structure, the tire shape testing device 1 illustrated in FIG. 2(b) is capable of reliably testing the region including the tread section 8 and the shoulder section 9.

Additionally, in the tire shape testing device 1 illustrated in FIG. 2(b), the first linear light application means 10 emits the linear light beam toward a part of the tread section 8 that cannot be irradiated with the linear light beam from the third linear light application means 13. The first linear light application means 10 and the third linear light application means 13 can reliably cover the wide tread section.

Similarly, in the tire shape testing device 1 illustrated in FIG. 2(a), the second linear light application means 12 emits the linear light beam toward a part of the sidewall section 7 that cannot be irradiated with the linear light beam from the third linear light application means 13. The second linear light application means 12 and the third linear light application means 13 can reliably cover the wide sidewall section 7.

Namely, according to the invention, the surface shape of the tire T can be easily detected over a wide region including the shoulder section 9 even when the tire is large or wide.

Second Embodiment

In the above-described first embodiment, the third linear light application means 13 is included in one of the sensor units 3 (in the first sensor unit 3a or the second sensor unit 3b). In the second embodiment, the third linear light application means 13 is disposed outside the sensor units 3a and 3b.

Figure 3:
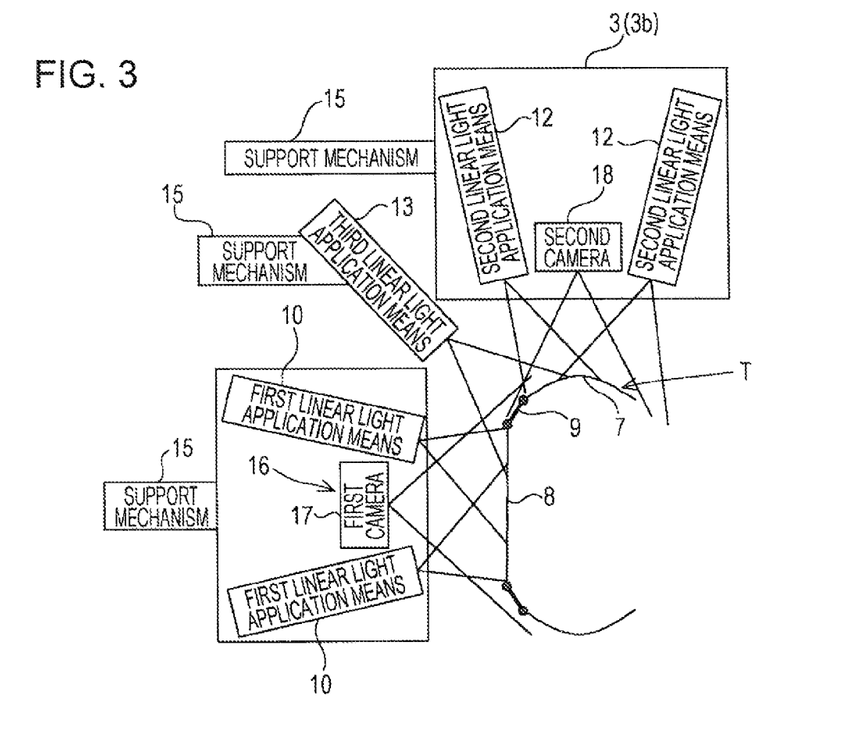
FIG. 3 is an enlarged illustration of a part around sensor units according to a second embodiment.

As illustrated in FIG. 3, the third linear light application means 13 is disposed between the first sensor unit 3a and the second sensor unit 3b, and an optical center of the third linear light application means 13 is directed toward the shoulder section 9.

Specifically, the third application means irradiates, with a linear light beam, a region from the tread section 8 to beyond the boundary section between the tread section 8 and the shoulder section 9 and a region from the shoulder section 9 to beyond the boundary section between the shoulder section 9 and the sidewall section 7. In other words, the third linear light application means 13 irradiates the entire region of the shoulder section 9, a part of the tread section 8, and a part of the sidewall section 7 with the linear light beam.

The third linear light application means 13 may be provided with a support mechanism 15 capable of changing the installation position of the third linear light application means 13, and be moved toward and away from the tire by the support mechanism 15 to adjust the region of the tire surface irradiated with the linear light beam.

Although the third linear light application means 13 irradiates both the tread section 8 and the sidewall section 7 with the linear light beam in this embodiment, the third linear light application means 13 may instead irradiate only one of them as long as the shoulder section 9 is irradiated. The second sensor unit 3b is provided at each side of the tire, and includes a plurality of (two) second linear light application means 12. The two second linear light application means 12 irradiate the entire region of the sidewall section 7 with linear light beams.

To summarize the above, in the tire shape testing device 1 illustrated in FIG. 3, the first sensor unit 3a including the first camera 17 and the first linear light application means 10 is arranged so as to face the tread section 8, and the second sensor unit 3b including the second camera 18 and the second linear light application means 12 is arranged so as to face the sidewall section 7. The third linear light application means 13 is located separately from the first sensor unit 3a and the second sensor unit 3b.

In this tire shape testing device 1, the first camera 17 included in the first sensor unit 3a or the second camera 18 included in the second sensor unit 3b is configured to capture an image of the linear light beam emitted from the third linear light application means 13 and reflected by the tire surface.

According to this embodiment, owing to the third linear light application means 13, the surface shape of the tire can be reliably detected over a wide region including the shoulder section. In addition, since the third linear light application means 13 is independent of the sensor units 3, the size of the sensor units 3 can be reduced.

The functions of the first camera 17 and the second camera 18 and the process performed by the image processing device 5 according to the second embodiment are similar to those in the first embodiment, and detailed explanations thereof are thus omitted.

Operational effects obtained because the tire shape testing device 1 includes a plurality of linear light application means (the first linear light application means 10, the second linear light application means 12, and the third linear light application means 13) are also similar to those in the first embodiment, and detailed explanations thereof are thus omitted.

Third Embodiment

In the above-described first and second embodiments, the image capturing means 16 (the first camera 17 and the second camera 18) may include an ordinary CCD camera, and the structure thereof is not particularly limited.

Figure 4:
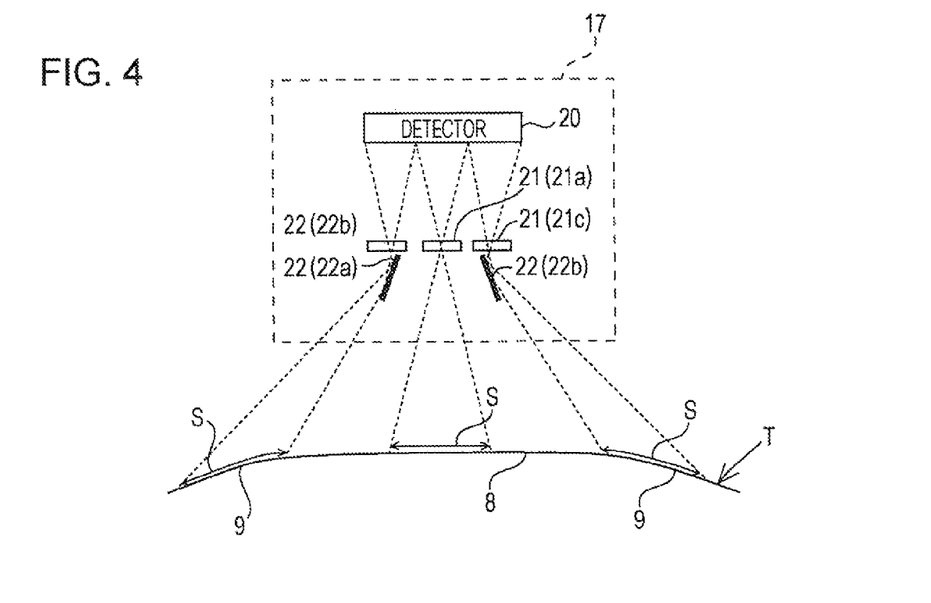
FIG. 4 illustrates a first modification of image capturing means according to a third embodiment.

However, image capturing means 16 according to a third embodiment has a specific structure including a plurality of fixed focal length lenses. For convenience of explanation, linear light beams reflected by the tire surface are referred to as reflected light beams.

As illustrated in FIG. 4, a first camera 17 includes a detector 20 including CCD elements that detect (capture images of) linear light beams, a plurality of (for example, three) lenses 21 that focus the images of the linear light beams on the detector 20, and region setting mirrors 22 that set image capturing regions to be captured through the lenses 21.

Each lens 21 is a fixed focal length lens 21, and the lenses 21 are arranged in a direction along the detector 20 with predetermined intervals therebetween in a case of the first camera 17. Specifically, a single lens 21 (hereinafter referred to as a center lens 21a) is disposed in a central area of the case of the first camera 17, and two lenses 21 (left lens 21b and right lens 21c) are arranged on both sides of the center lens 21a.

The region setting mirrors 22 guide the reflected light beams to the lenses 21 so that the image capturing regions of the lenses 21 (the center lens 21a, the left lens 21b, and the right lens 21c) do not overlap and are discontinuous.

Specifically, region setting mirrors 22a and 22b are respectively arranged in front of the left lens 21b and the right lens 21c (at the side opposite the detector 20). The region setting mirror 22a at the left side guides a reflected light beam toward the left lens 21b, and the region setting mirror 22b at the right side guides a reflected light beam toward the right lens 21c.

More specifically, the image capturing regions S are set so that the center lens 21a (one lens 21) receives the reflected light beam from a tread section 8, the left lens 21b (another lens 21) receives the reflected light beam from a left shoulder section 9 via the region setting mirror 22 at the left side, and the right lens 21c (another lens 21) receives the reflected light beam from a right shoulder section 9 via the region setting mirror 22 at the right side. The number of image capturing regions S may be changed by changing the number of lenses 21 and the number of region setting mirrors 22.

In the above-described first camera 17, the reflected light beam from a part of the tread section 8 is received by the center lens 21a, and the reflected light beam from a part of or the entire region of each shoulder section 9 is received by the left lens 21 or the right lens 21. Then, the reflected light beams are incident on the detector 20. Therefore, images of parts of the surface of the tire T that need to be tested can be selectively captured.

Although the first camera 17 is described above, similar to the first camera 17, a second camera 18 may include a detector 20, a plurality of (for example, two) lenses 21, and a region setting mirror 22. Since an image capturing section of the second camera 18 differs from that of the first camera 17, one lens 21 is arranged to receive a reflected light beam from a sidewall section 7, and the other lens 21 is arranged to receive a reflected light beam from a corresponding shoulder section 9. The region setting mirror 22 is preferably arranged near the one lens 21 or the other lens 21, so that two image capturing regions are set in the sidewall section 7 and the shoulder section 9.

With the above-described structure, the surface of the tire T can be tested over a wide region, and the surface shape of the tire can be easily detected over a wide region including the shoulder sections 9 even when the tire is large or wide.

Figure 5:
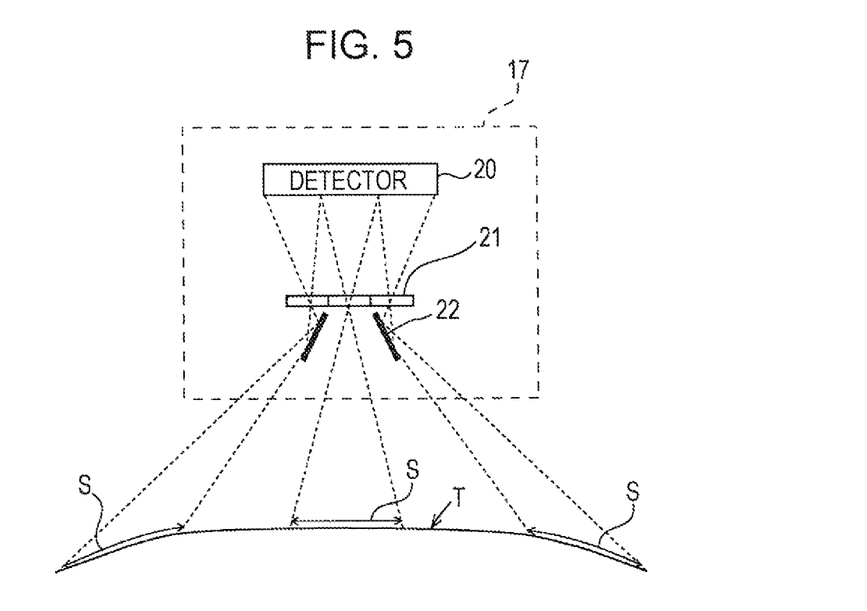
FIG. 5 shows a modification of image capturing means.

FIG. 5 shows a modification of the image capturing means 16 (modification of FIG. 4).

As illustrated in FIG. 5, the lenses 21 may be formed as a fly-eye lens (lens array) in which the lenses 21 are continuously arranged in the width direction. In this case, the lenses 21 can be easily manufactured and maintenance can be facilitated.

Figure 6:
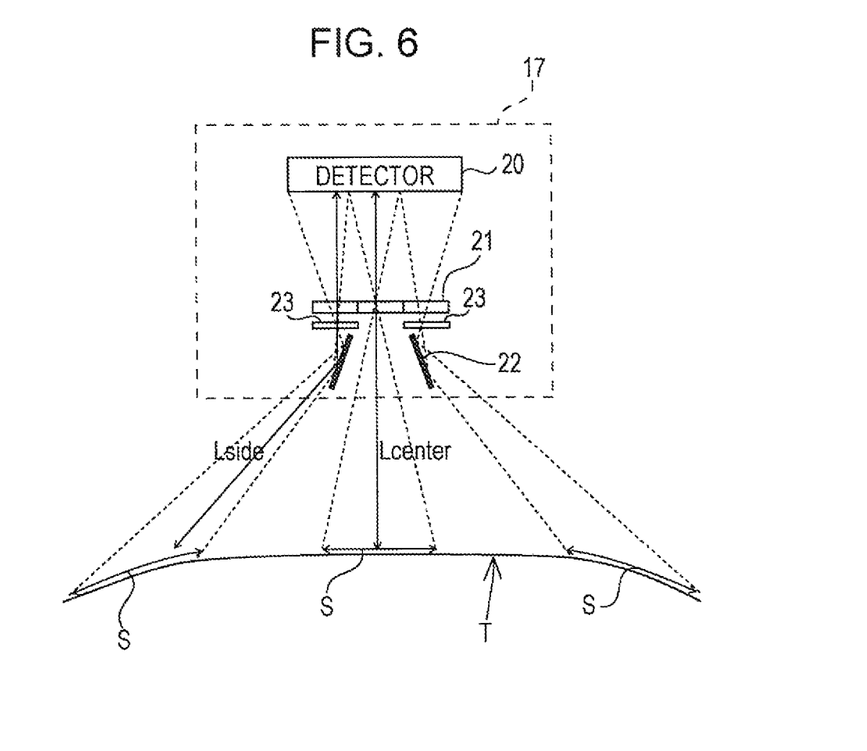
FIG. 6 shows a modification of image capturing means.

FIG. 6 shows another modification of the image capturing means 16 (another modification of FIG. 4).

As illustrated in FIG. 6, correcting lenses 23 that change and correct optical magnifications of the lenses 21 may be provided between the region setting mirrors 22 and the lenses 21. In the case where the optical axis direction between the tire and the detector 20 (Lcenter and Lside in the figure) differs between the image capturing regions S by large amounts, the resolution and image capturing area S also differ between the image capturing regions S by large amounts. When the correcting lenses 23 are provided as described above, the differences in the image capturing area S and resolution can be corrected, and the same magnification can be set for all the image capturing areas S. The correcting lenses 23 may be located between the detector 20 and the lenses 21.

Matters which are not explicitly disclosed in the embodiments disclosed herein, for example, the operating or running conditions, various parameters, and dimensions, weights, and volumes of structures are within the scope of ordinary creativity of a person skilled in the art, and matters that can be easily conceived by a person having an ordinary skill in the art are employed.

REFERENCE SIGNS LIST

1 tire shape testing device
2 tire rotator
3 sensor unit
4 measuring device
5 image processing device
7 sidewall section
8 tread section
9 shoulder section
10 first linear light application means
11 boundary section
12 second linear light application means
13 third linear light application means
15 support mechanism
16 image capturing means
17 first camera (first image capturing means)
18 second camera (second image capturing means)
20 detector
21 lens
22 region setting mirror
23 correcting lens

The invention claimed is:

1. A tire shape testing device that captures an image of linear light with which a surface of a tire including a sidewall section, a shoulder section, and a tread section has been irradiated and that detects a surface shape of the tire on the basis of the captured image of the linear light, the tire shape testing device comprising:
   a first light source configured to irradiate the tread section of the tire with a linear light beam;
   a second light source configured to irradiate the sidewall section of the tire with a linear light beam;
   a third light source configured to irradiate a region from the shoulder section of the tire to beyond the shoulder section with a linear light beam; and
   one or more cameras configured to capture images of the linear light beams emitted from the first light source, the second light source, and the third light source and reflected by the tire surface,
   wherein the linear light beams emitted from the first light source and the third light source overlap on a same line on the surface of the tire, and
   wherein the linear light beams emitted from the second light source and the third light source overlap on the same line on the surface of the tire.

2. The tire shape testing device according to claim 1,
   wherein the one or more cameras include a first camera and a second camera,
   wherein a first sensor unit including the first camera and the first light source is arranged so as to face the tread section of the tire,
   wherein a second sensor unit including the second camera, the second light source, and the third light source is arranged so as to face the sidewall section of the tire, and
   wherein the second camera included in the second sensor unit is configured to capture the image of the linear light beam emitted from the second light source and reflected by the tire surface and the image of the linear light beam emitted from the third light source and reflected by the tire surface.

3. The tire shape testing device according to claim 1,
   wherein the one or more cameras include a first camera and a second camera,
   wherein a first sensor unit including the first camera, the first light source, and the third light source is arranged so as to face the tread section of the tire,
   wherein a second sensor unit including the second camera and the second light source is arranged so as to face the sidewall section of the tire, and
   wherein the first camera included in the first sensor unit is configured to capture the image of the linear light beam emitted from the first light source and reflected by the tire surface and the image of the linear light beam emitted from the third light source and reflected by the tire surface.

4. The tire shape testing device according to claim 1,
   wherein the one or more cameras include a first camera and a second camera,
   wherein a first sensor unit including the first camera and the first light source is arranged so as to face the tread section of the tire, wherein a second sensor unit including the second camera and the second light source is arranged so as to face the sidewall section of the tire, wherein the third light source is located separately from the first sensor unit and the second sensor unit, and wherein at least one of the first camera included in the first sensor unit and the second camera included in the second sensor unit is configured to capture the image of the linear light beam emitted from the third light source and reflected by the surface of the tire.

5. The tire shape testing device according to claim 4, wherein the third light source is supported by a support capable of changing an installation position of the third light source.

6. The tire shape testing device according to claim 1, wherein the one or more cameras include a detector that detects the linear light beams, a plurality of lenses that focus the images of the linear light beams on the detector, and a region setting mirror that sets image capturing regions to be captured through the respective lenses.

7. The tire shape testing device according to claim 6, wherein two or more of the region setting mirrors are provided, each region setting mirror being set so that the image capturing regions captured through the respective lenses do not overlap and are discontinuous.

8. The tire shape testing device according to claim 7, wherein the image capturing region of one of the plurality of lenses is set so as to allow the tread section of the tire to be captured, and the image capturing region of another one of the plurality of lenses is set so as to allow the shoulder section of the tire to be captured.

9. The tire shape testing device according to claim 7, wherein the image capturing region of one of the plurality of lenses is set so as to allow the sidewall section of the tire to be captured, and the image capturing region of another one of the plurality of lenses is set so as to allow the shoulder section of the tire to be captured.

10. The tire shape testing device according to claim 6, wherein each lens is formed of a lens array.

11. The tire shape testing device according to claim 10, further comprising a correcting lens that corrects an optical magnification of each lens.

12. A tire shape testing method for capturing an image of linear light with which a surface of a tire including a sidewall section, a shoulder section, and a tread section has been irradiated and detecting a surface shape of the tire on the basis of the captured image of the linear light, the tire shape testing method comprising:

irradiating each of the tread section of the tire and the sidewall section of the tire with a linear light beam, irradiating a region from the shoulder section of the tire to beyond the shoulder section with a linear light beam, and capturing images of the linear light beams reflected by the tire surface, wherein the linear light beams that irradiate the tread section of the tire and the shoulder section of the tire overlap on a same line on the surface of the tire, wherein the linear light beams that irradiate the sidewall section of the tire and the shoulder section of the tire overlap on the same line on the surface of the tire, wherein the linear light beam that irradiates the tread section of the tire is emitted from a first light source, wherein the linear light beam that irradiates the sidewall section of the tire is emitted from a second light source, and wherein the linear light beam that irradiates the region from the shoulder section of the tire to beyond the shoulder section is emitted from a third light source.

* * * * *